United States Patent [19]
Yonkers et al.

[11] 4,257,524
[45] Mar. 24, 1981

[54] CASSETTE STORAGE RACK

[75] Inventors: Edward H. Yonkers, Newton; Alan Stenfors, Scituate; Gregory Mathus, Sudbury, all of Mass.

[73] Assignee: Data Packaging Corporation, Cambridge, Mass.

[21] Appl. No.: 956,050

[22] Filed: Oct. 30, 1978

[51] Int. Cl.³ .............................................. A47F 7/00
[52] U.S. Cl. ...................................... 211/71; 211/13; 312/15
[58] Field of Search ................... 211/40, 41, 71, 60 R, 211/13, 49 D, 89; 312/8, 9, 10, 11, 12, 13, 14, 15

[56] References Cited

U.S. PATENT DOCUMENTS

| | | | |
|---|---|---|---|
| 3,227,282 | 1/1966 | Punt | 211/41 X |
| 3,338,421 | 8/1967 | Lyman | 211/41 R |
| 3,502,222 | 3/1970 | Crafoord | 211/40 |
| 3,537,595 | 11/1970 | Mathisen | 211/60 R |
| 3,836,222 | 9/1974 | Kuntze | 312/10 X |
| 3,862,787 | 1/1975 | Hilsinger | 312/11 X |
| 3,969,007 | 7/1976 | Lowry | 312/15 |

FOREIGN PATENT DOCUMENTS 189257  11/1960  Sweden ...................................... 211/71

Primary Examiner—Roy D. Frazier
Assistant Examiner—Robert W. Gibson, Jr.
Attorney, Agent, or Firm—Wolf, Greenfield & Sacks

[57] ABSTRACT

A cassette storage rack having a tray-like base with dividers so as to orient the cassettes in their boxes uniformly in the rack. The cassette boxes are retained in the rack by means of a resilient foam block which engages one edge of each box and urges it against an opposite retaining wall.

8 Claims, 4 Drawing Figures

CASSETTE STORAGE RACK

INTRODUCTION

This invention relates to cassette storage units and more particularly comprises a new and improved storage rack for releasably holding a plurality of cassettes in their boxes in a neat and compact array.

With the tremendous increase in the use of audio cassettes for recording music, there is a substantial demand for attactive and relatively inexpensive cassette storage racks. A number of racks as well as other types of storage units have been developed. Some are quite complex and are made up of a number of separate parts. Their complexity obviously adversely effects the costs of such devices and they are more expensive than many are willing to pay for them. Certain of the devices in the prior art are also only suited for use on a table and are not really convenient as a means for transporting a number of cassettes from place to place and are not suited for use, for example, in automobiles. Some of such devices provide storage on more than one side and include pedestals that enable storage devices to rotate. While they are very attractive and have substantial versatility and capacity, they are not particularly well suited for transporting a number of cassettes from place to place, and they are too large to be used in most vehicles. Other devices on the market do not have means for firmly retaining the cassettes in place. Consequently, they are not suited to transport cassettes. Moreover, because they do not hold the cassettes firmly, the cassettes rattle when the devices are used in vehicles.

One important object of this invention is to provide a storage unit which is very inexpensive to manufacture and assemble.

Another important object of this invention is to provide a storage unit which firmly holds each of the cassettes accommodated in it so that it may be carried conveniently and will prevent rattling or shaking of the cassettes when used in a vehicle.

Another important object of this invention is to provide a storage rack for cassettes that may be used in a vehicle or in the home with equal facility.

To accomplish these and other objects, the unit of this invention is injection molded as a unitary structure and after molding it is only necessary to add a resilient foam block in the unit to complete the assembly. The unit includes a tray-like base subdivided into a number of compartments by dividers that are an integral part of the assembly. Walls which form part of the base are disposed to engage all four edges of each cassette box placed in the rack, and the resilient block which is hidden from view nevertheless is disposed to engage one edge of each box so as to firmly but releasably urge each box against an opposite edge of the base to releasably retain the cassette boxes in place.

These and other objects and features of this invention will be better understood and appreciated from the following detailed description of one embodiment thereof, selected for purposes of illustration and shown in the accompanying drawings.

BRIEF FIGURE DESCRIPTION

DETAILED DESCRIPTION

Figure 1:
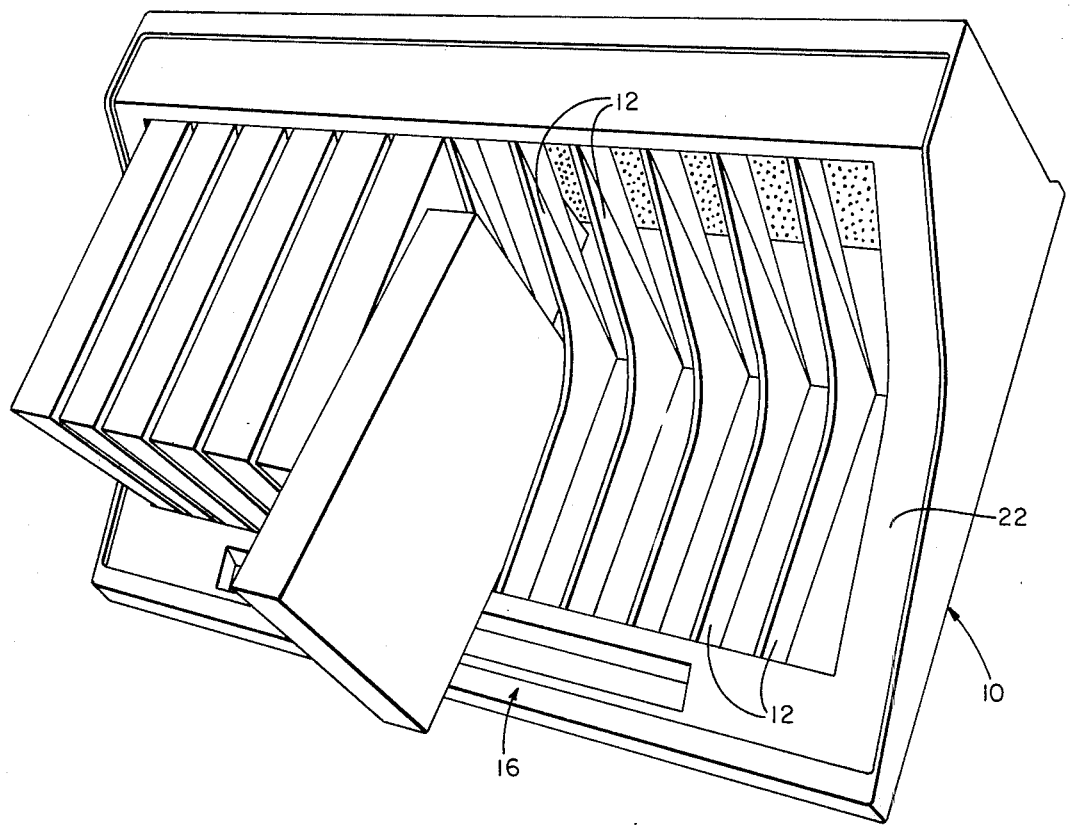
FIG. 1 is a pictorial view of a cassette storage rack constructed in accordance with this invention and holding a plurality of boxed cassettes.

The cassette storage rack shown in the drawings includes a base 10, dividers 12 and a foam plastic block 14 that serves as a spring to retain boxed cassettes mounted on the rack.

Figure 3:
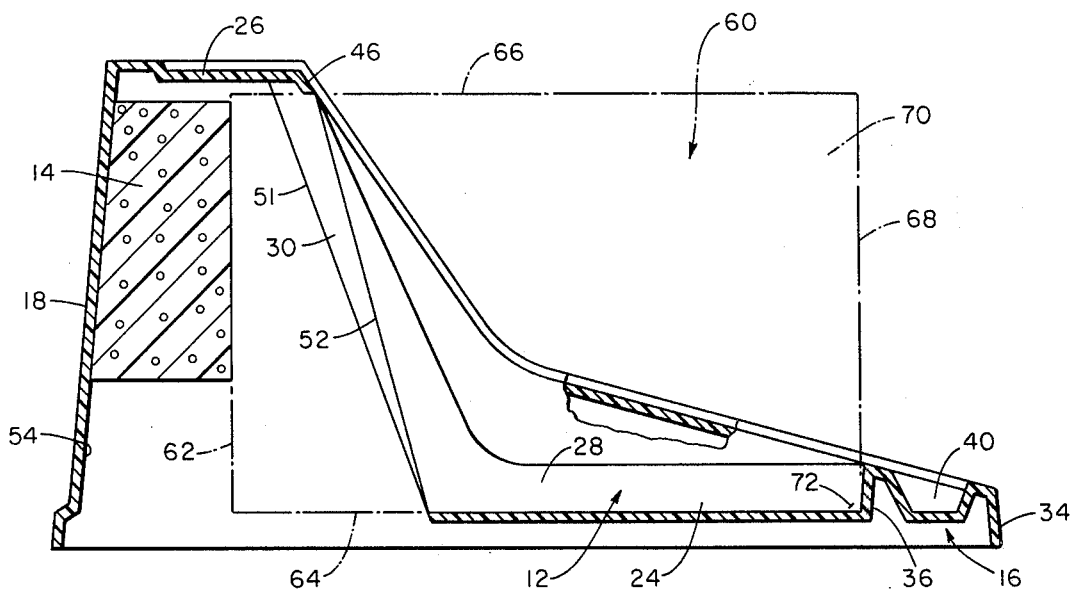
FIG. 3 is a cross-sectional elevation view of the rack holding a cassette case shown in phantom.
Figure 4:
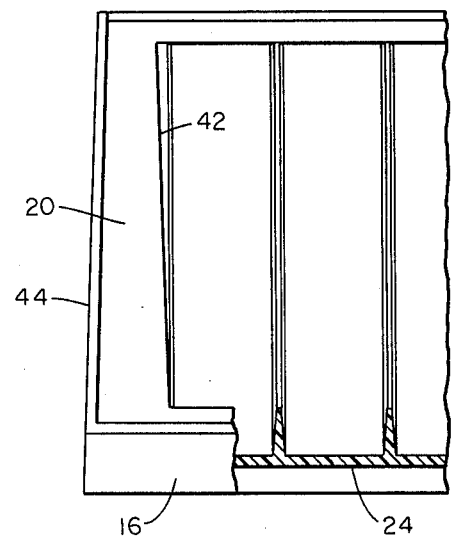
FIG. 4 is a fragmentary front elevation view of the rack.

Base 10 serves as a tray for the cassettes and includes a front member 16, rear side member 18 and tapered side walls 20 and 22 that define a frame about the tray. Bottom wall 24 is connected to the side walls 20 and 22 as well as front side member 16 and as is evident in FIG. 3, is sized to support more than half the long dimension of the cassette boxes mounted in the rack between the dividers 12.

The rear side member 18 is substantially taller than the front side member 16 and carries a top wall 26 in a plane parallel to that of bottom wall 24. The top wall is connected to the rear side member 18 as well as the side walls 20 and 22 and is spaced from the bottom wall 24 a distance slightly greater than the short dimension of the cassette boxes to be stored in the rack.

Dividers 12 are in the form of narrow ribs each having a lower portion 28 connected to the bottom wall 24 and front side member 16, and an upwardly and rearwardly extending portion 30 connected at the top to the lower surface 32 of top wall 26.

The front side member 16 is generally U-shaped in cross section having an outer flange 34, an inner flange 36 and a top wall 38. The top wall 38 is formed with a trough 40 along a substantial portion thereof which may be used if desired as a tray to hold a small tool or writing implement.

The tapered side walls 20 and 22 similarly are U-shaped, each having an inner wall 42 and outer wall 44. The U-shaped configuration of the side walls as well as the front side member lend rigidity to the assembly as well as providing an aesthetically more pleasing design. The inner walls 42 of the side wall members 20 and 22 extend rearwardly from the front side member 16 to the general plane of the upwardly extending rear portions 30 of the dividers 12. The top wall 26 is provided with a lip 46 which also adds stiffness to the assembly and enhances the appearance of the rack.

Figure 2:
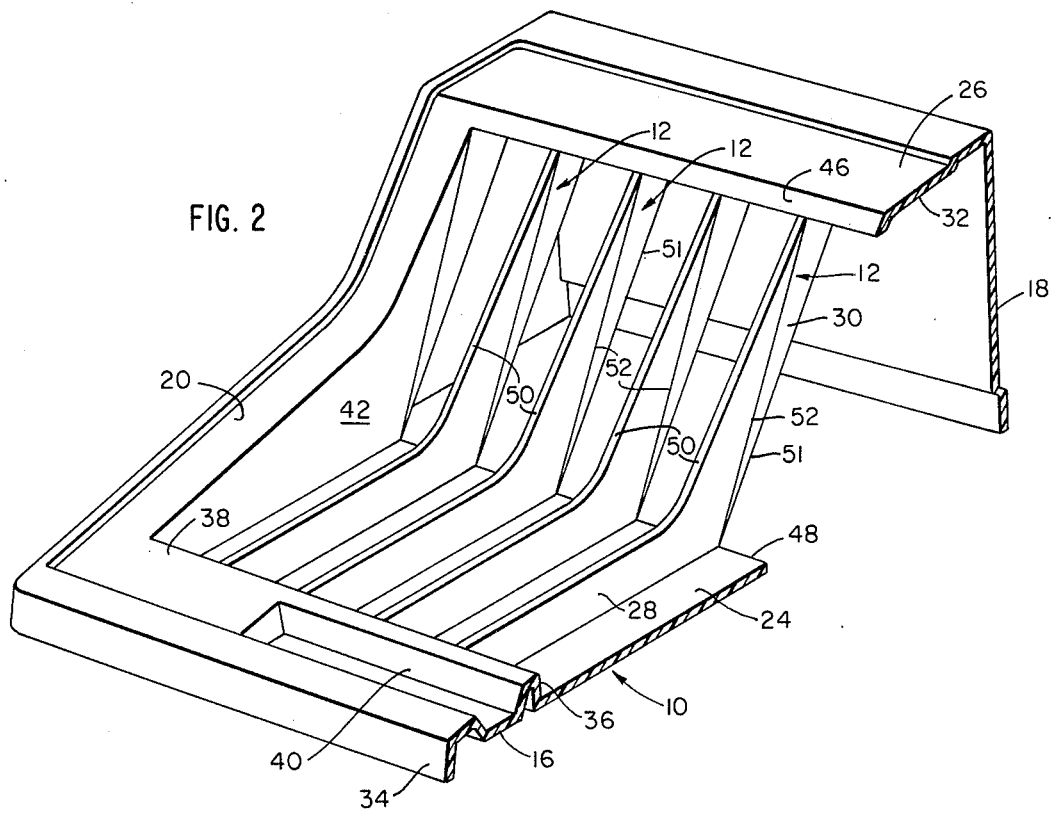
FIG. 2 is a fragmentary perspective view of the rack.

It will be noted in FIGS. 2 and 3 that top wall 26 is disposed rearwardly of the rear edge 48 of bottom wall 24 as viewed perpendicular to the bottom and top walls 24 and 26. The dividers 12 are provided with a draft of approximately 2° from their top edges 50 to bottom wall 24 and the mold shut off line 52 shown in FIG. 2. The rear portions 30 of dividers 12 also are tapered from rear edges 51 to the mold shut off line 52. In a related fashion, walls 34 and 36 of the front side member 16 converge upwardly, the sides of trough 40 diverge upwardly, wall 42 and 44 of the side members 20 and 22 converge upwardly, and the lip 46 and rear wall 18 converge upwardly so as to facilitate molding of the rack. It will be appreciated that as described and shown the rack may be molded as a unitary structure so as to eliminate any assembly of the components other than the resilient foam block 14. And the block 14 which typically may be made of polyurethane or synthetic rubber of appropriate durometer may be readily attached to the inner surface 54 of the rear wall 18 and/or the lower surface of top wall 26 in the position shown in FIG. 3.

In use, the individual cassettes in their respective boxes are stacked in the rack between the dividers 12. In FIG. 3 a cassette box 60 is shown with its rear edge 62 abutting against the resilient foam block 14, its lower edge 64 supported on bottom wall 24, its upper edge 66 engaging lip 46 on the top wall 26, and the other short side edge 68 engaging the retaining wall 36 which forms the inner wall of the front side member 16. The resilient block 14 yieldably urges the cassette box against the retaining wall 36 so that it is held firmly in the rack. To remove the boxed cassette from the rack, the user merely grasps the box adjacent its corner 70 and pushes the box inwardly against the block 14 so that the lower edge 72 of the box is freed from the retaining wall 36. In this fashion the box may be lifted from the rack without difficulty.

From the foregoing description it will be appreciated that the rack of this invention is inexpensive to manufacture, and because it is free of undercuts, the design of the mold for making the unit is not overly complicated and expensive. The rack displays the cassette boxes in an attractive fashion, and the edges of the boxes are exposed so that indicia may be applied to them to indicate what is contained on the particular cassettes stored in the separate boxes.

It will also be appreciated that while the rack is shown sitting essentially in a horizontal position, the rack may be used in other positions. For example, the rack may be oriented with the wall 18 disposed horizontally and wall 24 disposed vertically. In such a position, the separate cassette boxes would literally rest upon the foam block 14, which would nevertheless serve to urge them against the retaining wall 36. For maximum versality, it may be desirable to mold the rack with back wall 18 perpendicular to the plane of the lower edges of the side walls 20 and 22, rear wall 18 and front wall member 16.

Because numerous modifications may be made of this invention without departing from its spirit, we do not intend to limit the scope of this invention to the single embodiment illustrated and described. Rather, it is intended that the scope of this invention be determined by the apended claims and their equivalents.

What is claimed is:

1. A cassette storage rack comprising
   a base member,
   a plurality of dividing means secured to the base member for supporting boxes cassettes in a uniform array on it,
   retaining means secured to the base member for engaging one edge of each cassette box on the rack,
   and a resilient foam plastic block secured to the base member for engaging the edge of each cassette box in the rack opposite the edge engaging the retaining means for urging the cassette boxes against said retaining means to hold them in the rack,
   said top wall having a front edge spaced rearwardly of the retaining means and of a rear edge of the base member to define an open front and top area through which the cassettes are received, said open area permitting sufficient rotation of the cassette to engage, upon insertion, with the retaining means.

2. A cassette storage rack as defined in claim 1 further characterized by
   said base member, dividing means and retaining means being formed as a one piece integral unit.

3. A cassette storage rack as defined in claim 2 further characterized by
   means formed as an integral part of the base member for engaging the other two edges of each cassette box when placed in the rack.

4. A cassette storage rack comprising
   a tray-like base having four sides that define a frame,
   a generally rectangular bottom wall forming part of the base and connected to three sides of the frame and spaced from the fourth side thereof,
   a generally rectangular top wall forming part of the base and connected to the fourth side of the base and the sides adjacent thereto and being parallel to the bottom wall,
   a plurality of parallel dividing ribs secured to the top and bottom walls and spaced from the fourth side of the base,
   a resilient foam plastic block mounted on the fourth side of the base for urging cassettes placed in the rack against the side opposite the fourth side to retain the cassettes in the rack,
   and a retainer at the front of the base,
   said top wall having a front edge spaced rearwardly of the retainer to define an open front and top area through which the cassettes are received, said open area permitting sufficient rotation of the cassette to engage, upon insertion, with the retainer,
   said retainer including wall means at the front of the base extending above the plane of the base,
   and said top wall front edge terminating rearwardly of a rear of said base.

5. A cassette storage rack as defined in claim 4 further characterized by
   said base, ribs, top wall and bottom wall being molded as a one piece structure.

6. A cassette storage rack (as defined in claim 10 wherein) comprising;
   a generally rectangular base,
   a plurality of dividers mounted on the base for supporting boxed cassettes in a plane perpendicular to the base,
   a rear wall secured to the base and generally perpendicular to the base and the planes of the boxed cassettes when mounted on the rack,
   a top wall secured to the rear wall and overlying the base and adapted to engage the edges of the cassette boxes opposite the edges facing the base when the boxed cassettes are mounted on the rack,
   and spring means mounted in front of the rear wall and beneath the top wall for engaging the fourth edge of each cassette box mounted in the rack and urging them against the retainer to hold the cassette boxes in the rack,
   at least said base, dividers, top wall and retainer being molded as a unitary structure in a single molding operation to thus eliminate assembly of those components,
   said top wall having a front edge spaced rearwardly of the retainer to define an open front and top area through which the cassettes are received, said open area permitting sufficient rotation of the cassette to engage, upon insertion, with the retainer,
   wherein, the rear base edge is forwardly of the front edge of the top wall.

7. A cassette storage rack as defined in claim 6 wherein said top wall front edge is defined by a flange extending toward said base.

8. A cassette storage rack as defined in claim 7 wherein the vertical distance between said flange and base is substantially the same as the height of the cassette to provide a tight fit.

* * * * *